June 11, 1929.　　　A. S. LANGSDORF　　　1,716,448
CONVEYER SYSTEM
Filed Jan. 21, 1927
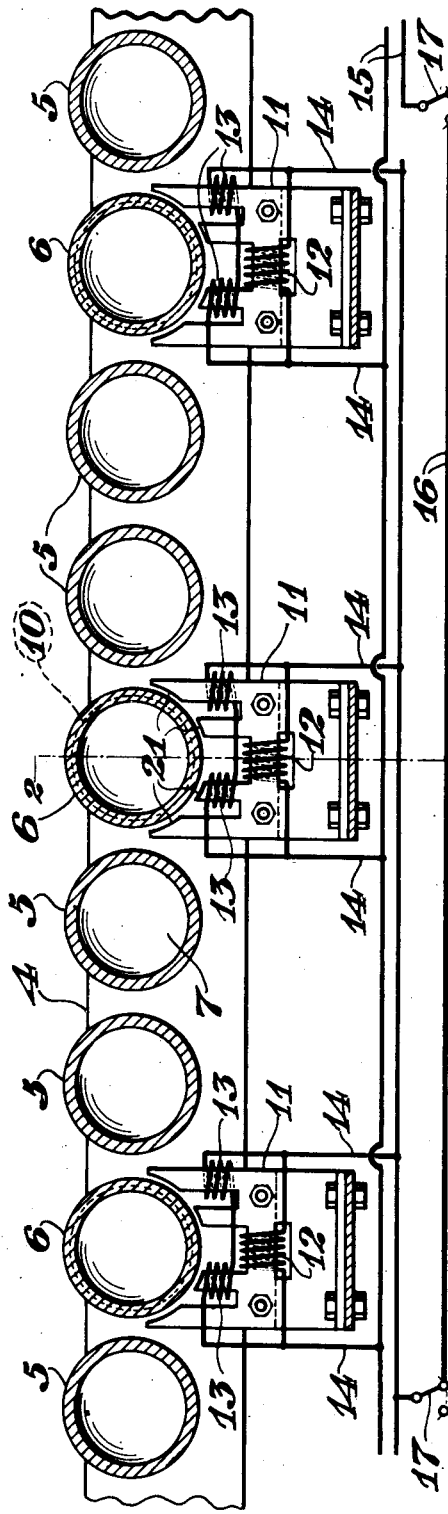
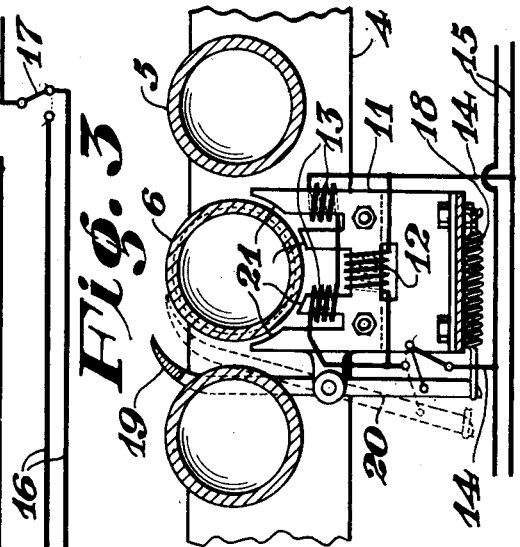
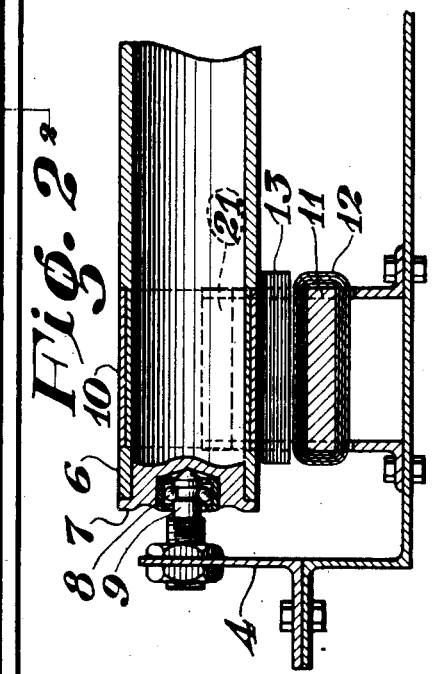
Inventor:
Alexander S. Langsdorf
by Cand Rand Brady
his Attorneys.

Patented June 11, 1929.

1,716,448

UNITED STATES PATENT OFFICE.

ALEXANDER S. LANGSDORF, OF ST. LOUIS, MISSOURI, ASSIGNOR TO ALVEY MANUFACTURING COMPANY, OF ST. LOUIS, MISSOURI, A CORPORATION OF MISSOURI.

CONVEYER SYSTEM.

Application filed January 21, 1927. Serial No. 162,600.

My invention relates to conveyer systems of the type wherein rollers are used for supporting the articles or packages as they travel along the way. In such systems, the rollers are disposed cross-wise of the way and as close together as may be required by the articles to be handled thereon. In power-roller conveyers, the rollers are operatively connected to a suitable source of power to be turned continuously thereby; and such live rollers feed the articles along the way. With gravity conveyers, the rollers are not connected to any driving power but simply rotate by reason of the frictional engagement therewith of the articles traveling under the influence of gravity or momentum. A gravity system is less expensive and preferable in some other respects to a power system, where practical conditions are suitable; but on some projects, where a gravity system would otherwise be practicable, actual conditions limit the grade at one or more points of the system to a value less than is necessary for the free running of the articles; and in such cases, it frequently happens that physical or economical conditions preclude the use of the ordinary types of power conveyer.

The principal object of the present invention is to provide for the use of live rollers at points where needed along the way without resorting to any of the usual expensive methods of furnishing power. Another principal object is to produce a system wherein rollers are turned by devices that are or may be normally idle but are brought into operation as occasion requires. Another principal object is to devise a roller-way construction wherein an individual roller will function as the rotor of a self contained motor in cooperation with an independent electrical stator. Other principal objects are: to devise a stator suitable for use in the limited space permitted by the conditions prevailing in a roller-way; to provide means whereby individual rollers are caused to rotate under the automatic control of a package on the way; and to obtain other advantages hereinafter appearing.

The invention consists principally in equipping the way with one or more devices each adapted to turn an individual roller; also in arranging such devices so that they operate only when occasion requires, such devices being controlled positively by an attendant or automatically by electrical switches operated by articles on the roller-way. It also consists in a roller-way wherein individual rollers function as rotors for electrical stators respectively. It also consists in the parts and arrangements and combinations of parts hereinafter described and claimed.

In the accompanying drawing, wherein like reference numerals refer to like parts wherever they occur, Fig. 1 is a vertical longitudinal section through a portion of a conveyer provided with electrically operated live rollers and manually operated electrical switches for controlling said rollers;

Fig. 2 is a vertical section through one of the sides of the conveyer and the adjacent end portion of one of the live rollers on the line 2—2 in Fig. 1; and Fig. 3 is a vertical longitudinal section through a conveyer provided with electrically operated live rollers and an electrical switch adapted to be controlled automatically by articles on the roller-way.

The present system comprises a frame work 4, such as is used in the ordinary gravity conveyer, and rollers 5 and 6 extending cross-wise of the side frame work and rotatably mounted therein to constitute the bed of the roller-way. As shown in the drawing, the rollers are in the form of hollow cylinders whose ends are closed by caps 7 provided with central circular recesses arranged to receive antifriction members 8 mounted on the inner ends of bearing spindles 9 bolted to the side rails of the frame. In the ordinary gravity conveyer, the inclination or grade of the way is sufficient to keep the articles thereon moving under the influence of gravity or momentum, and the rollers are all idle. According to the present invention, the rollers 5 may be normally idle; but at points where the inclination of the way is insufficient to keep the articles moving, devices are provided for turning the rollers 6 so located. Such live rollers 6 are of substantially the same diameter as the idle rollers 5 and are positioned and adapted to function like them as parts of the bed of the way.

The live rollers 6 are designed to function as rotors of induction motors. For this purpose, each live roller 6 is provided with an external cylindrical sleeve 10, preferably of copper or alumium, such live rollers being rotatably mounted, in the side frames of the way, after the manner of an ordinary idle roller. Where additional expense is permissible, it is sometimes preferable to use a rotor of the well-known squirrel-cage type.

The stator 11 illustrated in the accompanying drawing is designed with particular reference to the close spacing of the rollers along the way. In the first place, the stator must be entirely below the top of the roller so as to be clear of passing articles. In the next place, the rollers are usually so close together that it is impracticable to extend the stator above the plane of the axes of the rollers. In view of these conditions, the stator is preferably made in the form illustrated, which may be described generally as being of the shape of a channel with its open side facing upwardly toward the rotor and with the surfaces of its ends or pole faces 21 adjacent to the rotor concaved conformably to the curvature of the rotor. The middle portion of the channel or frame of the stator is wound with a main coil 12 that is in electrical circuit with a suitable source of electrical energy. The ends of the channel or frame are slotted lengthwise and each is provided with an auxiliary coil 13 that functions as a shading or teaser coil, one of these shading coils being on the inner portion of one arm and the other shading coil being on the other side of the other arm. Preferably, the overall width of the stator 11 is about equal to or slightly less than the center to center distance of adjacent rollers, so that two such stators may be located side by side. The axial length of the stator may be less than that of the roller, so that even if the width of the stator exceeds the center to center spacing of the rollers, the stators may be staggered to permit placing them in working relation with adjacent rollers.

The torque, speed, and power of the motor are dependent upon the magnitude of the magnetic flux and the strength of the current induced in the rotor; and as the strength of the rotor current induced by a given amount of magnetic flux increases as the electrical resistance of the material of the roller decreases, it is desirable to make the wall of the shell 10 or roller 6 with an exterior coating or shell of highly conducting material, such as copper or aluminum. While the drawing illustrates the copper or aluminum shell 10 as a cylindrical tube, it may be made to resemble the well-known squirrel-cage winding by cutting slots in the shell parallel or nearly parallel to the axis of the roller, thereby more definitely fixing the path of the currents induced in the conducting shell of the rotor.

As shown in Fig. 1, each stator is electrically connected, as indicated at 14, to a suitable source of electrical energy furnished by a supply line 15; and the circuit 16 for controlling the the stator is provided with suitable switches 17 adapted to be controlled positively by the attendant.

In the modified construction shown in Fig. 3, the stator is shown provided with a switch adapted to be operated automatically by the packages or articles on the way. A suitable form of switch comprises a pivotally mounted operating arm or lever 20 which is provided with a spring 18 that normally holds it in open position and has a laterally extending arm 19 arranged in the path of articles traveling towards the particular roller that is under the control of said switch so as to be operated by such an article bearing against the lateral arm thereof before such article reaches the particular roller that is under the control of such switch. When the article bears against the arm of the lever, it causes the switch to close the circuit of the corresponding stator and bring about the rotation of the roller constituting the rotor thereof.

In the designs hereinbefore described, the stator is located below the way, which location has the advantages of economizing floor space, protecting the stators from exposure to injury, and making the system economical to construct.

Obviously the construction hereinbefore described admits of considerable variation without departing from my invention. For instance, other types of electrical motors may be used in place of the electrical motors hereinbefore described; and the motors may be connected individually to the source or sources of electrical energy or it may be preferable on occasions to arrange two or more of such motors either in multiple or series, under the control of one switch. In fact, spring motors or other mechanical motors may be used instead of such electrical motors and operatively arranged to actuate individual rollers independently of the other rollers.

The arrangement above described constitutes a single-phase induction motor of the shading coil or split-phase type, wherein the shading coils serve to delay the magnetic flux in the rotor and thereby produce the torque on the rotor. In consequence of such torque, the rotor is caused to turn whenever an energizing current passes through the main circuit of the stator. It is noted that although more or less heat is generated in the rotor, the radiating surface thereof is so large that such heat is readily dissipated. It is also noted that the voltage induced in the rotor is so small that the rollers may be handled with impunity.

What I claim is:

1. In a conveyer system, a way comprising closely spaced rollers, some of which constitute electrical rotors, and electrical stators respectively operatively related to said rotors to turn the same, said stators being located wholly below the level of the axes of their rotors.

2. In a conveyer system, a way comprising rollers, some of which constitute electrical rotors, and electrical stators for the respective rotors, said stators being located outside of and beneath said rollers out of the way of traffic thereon.

3. In a conveyer system, a way comprising rollers, some of which constitute electrical rotors, and electrical stators of the shading coil type for the respective rotors, said stators being located below the level of the axes of said rotors.

4. In a conveyer system, a way comprising rollers, some of which are adapted to constitute electrical rotors, and electrical stators of the shading coil type for the respective rotors, each of said stators being outside of and below its rotor and having its pole pieces on opposite sides thereof with their adjacent surfaces approximating the curvature of the rotor.

5. In a conveyer system, a way comprising rollers, some of which constitute electrical rotors, and stators of the shading coil type for the respective rotors, said stators being outside of and below their respective rotors and having their pole pieces on opposite sides thereof with the adjacent faces of said pole pieces approximating the curvature of the rotor, said pole pieces being slotted vertically and provided with shading coils.

Signed at St. Louis, Missouri, this 19th day of January, 1927.

ALEXANDER S. LANGSDORF.